(12) United States Patent
Tamai et al.

(10) Patent No.: US 7,651,795 B2
(45) Date of Patent: Jan. 26, 2010

(54) PERPENDICULAR MAGNETIC RECORDING MEDIUM AND MANUFACTURING OF THE SAME

(75) Inventors: Ichiro Tamai, Kanagawa (JP); Ikuko Takekuma, Kanagawa (JP); Yoshiyuki Hirayama, Tokyo (JP); Yuzuru Hosoe, Tokyo (JP); Yoshinori Honda, Kanagawa-ken (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 579 days.

(21) Appl. No.: 11/227,675

(22) Filed: Sep. 14, 2005

(65) Prior Publication Data

US 2006/0057431 A1 Mar. 16, 2006

(30) Foreign Application Priority Data

Sep. 14, 2004 (JP) .............................. 2004-266172

(51) Int. Cl.
G11B 5/65 (2006.01)
(52) U.S. Cl. .................................................. 428/836.2
(58) Field of Classification Search .............. 428/836.2, 428/831, 831.2, 832.1, 837
See application file for complete search history.

(56) References Cited

U.S. PATENT DOCUMENTS

| 2002/0136926 A1* | 9/2002 | Oikawa et al. ........... 428/694 T |
| 2002/0164501 A1 | 11/2002 | Hikosaka | |
| 2003/0186086 A1* | 10/2003 | Abarra et al. .......... 428/694 TS |
| 2005/0058854 A1* | 3/2005 | Takekuma et al. .... 428/694 TM |
| 2005/0142388 A1 | 6/2005 | Hirayama et al. | |
| 2005/0202286 A1* | 9/2005 | Chen et al. .................. 428/831 |

FOREIGN PATENT DOCUMENTS

| JP | 2004-022138 | 1/2004 |
| JP | 2004-220737 | 8/2004 |
| JP | 2004220737 A * | 8/2004 |

OTHER PUBLICATIONS

T. Oikawa et al., "Microstructure and Magnetic Properties of CoPtCr-SiO$_2$ Perpendicular Recording Media", IEEE Transactions on Magnetics, vol. 38, No. 5, Sep. 2002.

(Continued)

*Primary Examiner*—Holly Rickman
*Assistant Examiner*—Lisa Chau
(74) *Attorney, Agent, or Firm*—Townsend and Townsend and Crew LLP; Rambod Nader

(57) ABSTRACT

Embodiments of the embodiment are directed to reducing the inter-granular exchange coupling of an oxide granular medium and obtaining a high media S/N value, resulting in an areal recording density greater than 23 gigabits per square centimeter or more being achieved. In one embodiment, a magnetic recording medium comprises a structure laminating a soft-magnetic underlayer, a lower intermediate layer including Ru, an upper intermediate layer consisting of Ru crystal grains and oxide crystal grain boundaries, a magnetic recording layer consisting of crystal grains and oxide crystal grain boundaries, in order, on a substrate, growing crystal grains of the magnetic recording layer epitaxially on the Ru crystal grains of the upper intermediate layer, and growing the crystal grain boundaries of the magnetic recording layer on the crystal grain boundaries of the upper intermediate layer.

6 Claims, 8 Drawing Sheets

(Sample 1-1)

(Sample 1-5)

(Sample 1-7)

OTHER PUBLICATIONS

Yoshiyuki Hirayama et al., "Low Noise Performance of CoCrPt Single-Layer Perpendicular Magnetic Recording Media", IEEE Transactions on Magnetics, vol. 36, No. 5, Sep. 2000.

T. Shimatsu et al., "High Potential of Thin CoPtCr-$SiO_2$/Ru Perpendicular Recording Media to Resist Thermal Agitation", Abstracts of the 9th Joint MMM/Intermag Conference, BC-09, p. 84 (2004).

* cited by examiner (a)

(b)

(c)

(Sample 1-1)

(Sample 1-5)

(Sample 1-7)

(Sample2-1)

US 7,651,795 B2

PERPENDICULAR MAGNETIC RECORDING MEDIUM AND MANUFACTURING OF THE SAME

CROSS-REFERENCES TO RELATED APPLICATIONS

This application claims priority from Japanese Patent Application No. JP2004-266172, filed Sep. 14, 2004, the entire disclosure of which is incorporated herein by reference.

BACKGROUND OF THE INVENTION

The present invention relates to a perpendicular magnetic recording medium and more particularly to a magnetic recording medium having an areal recording density greater than 23 gigabits per square centimeter.

Recently, an oxide granular medium using a material, in which an oxide is added to a CoCrPt-based alloy, has been proposed as a perpendicular magnetic recording medium having excellent thermal stability and a high media S/N value. For instance, a medium using CoCrPt—$SiO_2$ as the magnetic recording medium is disclosed in IEEE Trans. Magn., vol. 38, p. 1976 (2002). As shown in IEEE Trans. Magn., vol. 36, p. 2396 (2000), a conventional CoCrPt medium with a Cr-segregated structure has a problem that the perpendicular uniaxial magnetic anisotropy energy is decreased due to the formation of an initial growth layer of the magnetic recording layer. The initial growth layer herein means an amorphous-like layer with a thickness of several nanometers. On the other hand, it is reported that the above-mentioned initial growth layer of the magnetic recording layer is not observed in an oxide granular medium as disclosed in JP-A No. 217107/2003. Moreover, as disclosed in the Abstracts of the 9th Joint MMM/INTERMAG Conference, BC-09, p. 84 (2004), it is reported that a 4 nm thick magnetic recording layer has almost the same perpendicular uniaxial magnetic anisotropy energy as a 15 nm thick layer, which means that an oxide granular medium gives a magnetic recording layer in which deterioration of the crystal structure can almost not be observed in the vicinity of the interface with the intermediate layer.

BRIEF SUMMARY OF THE INVENTION

In order to obtain a high media S/N value it is necessary to reduce the inter-granular exchange coupling of the magnetic recording layer. As described above, in the oxide glandular medium, the magnetic recording layer has no initial growth layer and the grain boundaries of the magnetic recording layer are formed from the interface with the intermediate layer. However, a high media S/N value cannot be obtained because the inter-granular exchange coupling is not reduced sufficiently.

It is a feature of the present invention to provide an oxide granular medium reducing the inter-granular exchange coupling and achieving a high media S/N value, enough to realize an areal recording density greater than 23 gigabits per square centimeter.

In accordance with an aspect of the present invention, a perpendicular magnetic recording medium comprises a substrate, a soft-magnetic underlayer deposited on the substrate, a lower intermediate layer containing Ru deposited on the soft-magnetic underlayer, an upper intermediate layer consisting of Ru crystal grains and oxide crystal grain boundaries deposited on the lower intermediate layer, and a magnetic recording layer consisting of crystal grains and oxide crystal grain boundaries deposited on the upper intermediate layer. The crystal grains of the magnetic recording layer grow epitaxially on the Ru crystal grains of the upper intermediate layer and the crystal grain boundaries of the magnetic recording layer grow on the crystal grain boundaries of the upper intermediate layer. The width of crystal grain boundary of the magnetic recording layer is almost constant from the interface with the intermediate layer to the mid position of the magnetic recording layer thickness.

According to the present invention described above, the formation of grain boundaries around the interface of the magnetic recording layer with the intermediate layer is promoted, and the grain boundaries can be made constant from the interface with the intermediate layer to the mid position of the magnetic recording layer thickness, whereby it is possible to reduce the inter-granular exchange coupling and achieve a higher media S/N value.

DETAILED DESCRIPTION OF THE INVENTION

Figure 1:
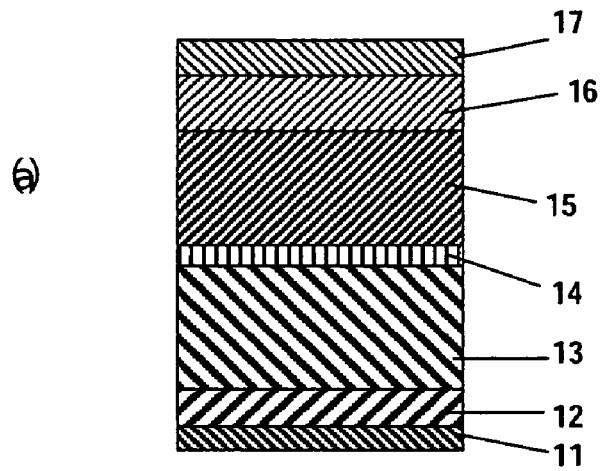
FIG. 1 illustrates examples of a perpendicular magnetic recording medium.
Figure 1:
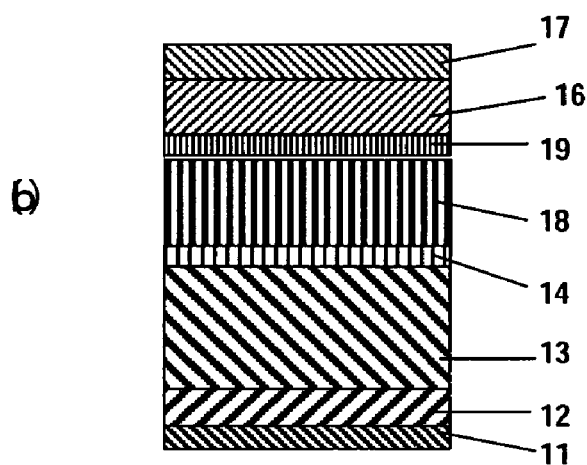
Figure 1:
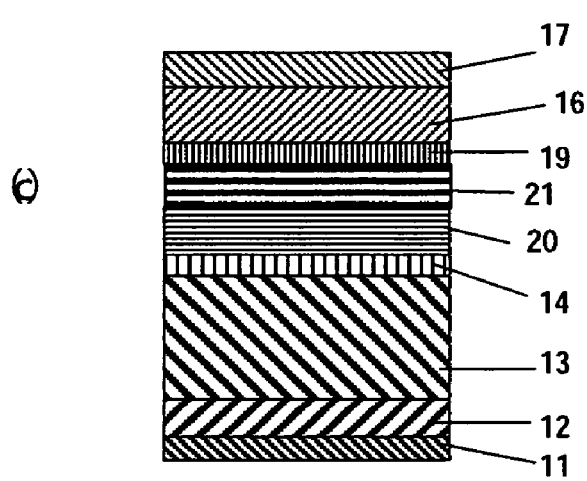

A perpendicular magnetic recording medium of the present invention has a difference in position along the depth direction of 1 nm or less, in which the contents of oxygen and Co maintain 95% of their respective contents at the mid position of the magnetic recording layer, in a depth profile of the element content around the interface of the magnetic recording layer with the upper intermediate layer obtained by using X-ray photoelectron spectroscopy. Moreover, in a Kerr rotation angle $\phi$ measured by applying a magnetic field H along the in-plane direction by using a Kerr effect magnetometer, a perpendicular magnetic recording medium of the present invention satisfies the relation of $a/b \leq 1.5$, where b is the average value of $d\phi/dH$ for an absolute value of the applied magnetic field H of 400 kA/m or more and 700 kA/m or less, and a is the average value of $d\phi/dH$ for an applied magnetic filed of −16 kA/m or more and 16 kA/m or less.

In order to obtain the perpendicular magnetic recording medium, a structure laminating a lower intermediate layer and an upper intermediate layer in that order is taken as an intermediate layer, in which the lower intermediate layer consists of Ru or a Ru-based alloy containing a metallic element, and the upper intermediate layer has a granular structure consisting of Ru crystals surrounding grain boundaries made of at least one material selected from a group of Si oxide, Al oxide, Ti oxide, Cr oxide, and Mg oxide. It is preferable that the main element, except for oxygen, constituting the grain boundaries of the upper intermediate layer is identical to the main element except for oxygen, constituting the grain boundaries of the magnetic recording layer. In this way it is possible to manufacture a perpendicular magnetic recording medium, in which the width of crystal grain boundary of the magnetic recording layer is kept almost constant from the interface with the intermediate layer to the mid position of the film thickness by fabricating the upper intermediate layer to be a granular structure which has grain boundaries consisting of the same oxide as those of the magnetic recording layer.

In order to make the upper intermediate layer a structure consisting of Ru and grain boundaries made of an oxide surrounding it, it is necessary to create in the lower intermediate layer placed underneath the upper intermediate layer roughness, which will be a trigger for grain boundary formation. Moreover, crystal grain alignment of the lower intermediate layer must be improved as much as possible because it is easy for the crystal grain alignment to deteriorate when an oxide is added in the upper intermediate layer. In order to form a film with excellent crystal grain alignment, it is preferable that the film be formed by at least one process selected from a sputtering process in a low gas pressure atmosphere and a sputtering process with a high deposition rate, but, in this case, it is difficult to create roughness on the surface. On the other hand, in order to create surface roughness, it is preferable that the film be formed by at least one process selected from a sputtering process in a high gas pressure atmosphere and a sputtering process with a low deposition rate, but a problem arises that the crystal grain alignment deteriorates with increasing surface roughness. In the present invention, in order to achieve both high crystal grain alignment and surface roughness, the lower intermediate layer is formed by laminating the first lower intermediate layer and the second lower intermediate layer in order, which are fabricated by different film manufacturing processes. A preferable method for fabricating the first intermediate layer is one selected from sputtering in an Ar gas atmosphere of 0.5 Pa or more and 1 Pa or less and sputtering with a deposition rate of 2 nm per second or more, and a preferable method for fabricating the second lower intermediate layer is one selected from sputtering in an Ar gas atmosphere of 2 Pa or more and 6 Pa or less and sputtering with a deposition rate of 1 nm per second or less. Forming an intermediate layer, in which the crystal grain alignment is excellent and the upper intermediate layer in contact with the magnetic recording layer has a granular structure, makes it possible to fabricate a perpendicular magnetic recording medium having an areal recording density of 23 gigabits or more per square centimeter.

A perpendicular magnetic recording medium was prepared as a sample by using sputtering equipment (C3010) manufactured by ANELVA. This equipment consists of 10 process chambers and one substrate load/unload chamber, and each chamber is exhausted independently. The exhaust ability of all chambers is $6 \times 10^{-6}$ Pa or less.

The magnetic characteristics were measured by using a Kerr effect magnetometer. At that time, the magnetic field was swept at a constant rate from +1750 kA/m to −1750 kA/m for 64 seconds. The gradient of the Kerr loop obtained was corrected between 1200 kA/m and 1600 kA/m to be zero in order to remove the effect of the soft-magnetic underlayer. A fully automated XPS analysis equipment with scanning X-ray source (Quantera SXM) manufactured by ULVAC-PHI was used for the composition analysis of the film, and it is analyzed by using Co 2p, Si 2s, O 1s, Ru 3d and C 1s. An aluminum emit −Kα was used for the X-ray source, an electron beam into a hemispherical analyzer was used for the spectroscope, and a 32Multi-Channel Detector was used for the detector. The X-ray power was 45 W at 15 kV. The depth profile of the element content was obtained by etching from the film surface using an ion gun with an acceleration voltage of 500 V, and the composition analyses were carried out every 0.5 nm. This sputter rate corresponded to 1.04 nm/min when converting it with $SiO_2$.

The recording/reproducing characteristics were evaluated by the spin stand. The head used for the evaluation was a composite magnetic head consisting of a giant-magnetoresistive (GMR) reader with a shield-gap length of 62 nm and a read width of 120 nm and a single-pole type (SPT) writer with a write width of 150 nm. The output amplitude and noise were measured under the condition that the relative velocity between head and medium was 10 m/s, the skew angle 0°, and the magnetic spacing about 15 nm. The media S/N value was evaluated by a ratio of the isolated signal amplitude at 50 kFCI to the media noise at the linear recording density of 600 kFCI.

Hereafter, the embodiment of the present invention will be described by way of example with reference to accompanying drawings.

Embodiment 1

FIG. 1(a) is a drawing illustrating an example of a perpendicular magnetic recording medium. The perpendicular magnetic recording medium of this embodiment has a structure 1 laminating the pre-coat layer 12, the soft-magnetic underlayer 13, the seed layer 14, the intermediate layer 15, the magnetic recording layer 16, and the overcoat layer 17, in order, on the substrate 11. A glass substrate with a thickness of 0.635 mm and a diameter of 65 mm was used for the substrate 11. First, in order to suppress the effects of chemical inhomogeneity of the substrate surface on the characteristics of the soft-magnetic underlayer, the Ni-37.5 at. % Ta-10 at. % Zr pre-coat layer 12 was formed and a Co-8 at. % Ta-5 at. % Zr layer was deposited thereon as a soft-magnetic underlayer 13. A structure, in which two layers are coupled antiferromagnetically through the Ru layer, was used for the soft-magnetic underlayer 13. The seed layer 14 and the intermediate layer 15 were deposited after depositing the soft-magnetic underlayer 13; the 14 nm thick magnetic recording layer 16 consisting of a Co-17 at % Cr-14 at % Pt alloy to which 17.5 vol % of Si oxide is added, and the 4 nm thick CN overcoat layer 17 were deposited thereon. Ar was used for the sputter gas and oxygen was added at a partial pressure of 20 mPa when the magnetic recording layer was deposited. When the overcoat layer 17 was deposited, nitrogen was added at a partial pressure of 50 mPa to an Ar pressure of 0.6 Pa during deposition.

Various samples were fabricated and their grain morphology and properties were compared and studied in detail to reduce the inter-granular exchange coupling of the magnetic recording layer. Especially, it was considered that the factors of the layer structure and deposition condition of the intermediate layer were important, so that samples having these different factors were prepared. The layer structure and deposition condition of the intermediate layer of the prepared samples are shown in Table 1.

The samples 1-1 to 4 have the structure shown in FIG. 1(a); the sample 1-5 has the structure shown in FIG. 1(b); and the samples 1-6 to 12 has the structure shown in FIG. 1(c). All of them in FIG. 1(b) except for the intermediate layer 15 have the same structure as in FIG. 1(a); they have a structure in which the lower intermediate layer 18 and the upper intermediate layer 19 are laminated in lieu of the intermediate layer 15. The thicknesses of the lower intermediate layer and the upper intermediate layer of the sample 1-5 were 16 nm and 4 nm, respectively. All of them in FIG. 1(c) except for the intermediate layer 15 have the same structure as in FIG. 1(a); they have a structure in which the first lower intermediate layer 20, the second intermediate layer 21, and the upper intermediate layer 19 are laminated in order in lieu of the intermediate layer 15. The materials and deposition conditions of the seed layer and each intermediate layer are also shown in Table 1. An oxide was added to Ru with a ratio of 15 vol. % in the intermediate layers of sample 1-3 and sample 1-4 and the upper intermediate layers of samples 1-5 to 12. Moreover, the thicknesses of the first lower intermediate layer, the second lower intermediate layer, and the upper intermediate layer of samples 1-6 to 12 were 8 nm, 8 nm, and 4 nm, respectively.

Cross-sectional bright field TEM images of all these samples were observed by using a Transmission Electron Microscope (TEM). Crystal grains are observed as dark contrast in the TEM image of a granular medium because of the strong diffraction intensity, and crystal grain boundaries consisting of oxide are observed as bright contrast because of the weak diffraction intensity, so that they are clearly distinguished from each other. As the typical examples, the observation results of the cross-sectional structures of samples 1-1, 1-5, and 1-7 are shown in FIGS. 2(a), 2(b), and 2(c), respectively.

The cross-sectional TEM images obtained were analyzed paying attention to the deviation of the width of crystal grain boundary of the magnetic recording layer from the interface with the intermediate layer to the mid position of the magnetic recording layer. Hereinafter, the interface of the magnetic recording layer with the intermediate layer means the interface of the magnetic recording layer 16 with the intermediate layer 15 in the structure illustrated in FIG. 1(a) and the interface of the magnetic recording layer 16 with the upper intermediate layer 19 in the structure illustrated in FIG. 1(b) and FIG. 1(c). The width of crystal grain boundary of each position was measured using the condition in which the interface of the magnetic recording layer with the intermediate layer is assumed to be a position 1 nm away from the interface with the intermediate layer, and the mid position of the magnetic recording layer is assumed to be at a position of ½ of the magnetic recording layer thickness. The average value of the width of crystal grain boundary at 30 places was assumed to be the width of crystal grain boundary.

The sample 1-1 of the comparative example 1 had a width of crystal grain boundary of 0.5 nm around the interface of the magnetic recording layer with the intermediate layer as opposed to a width of crystal grain boundary of 1.1 nm at the mid position of the magnetic recording layer. In the samples 1-2 to 5 which are the same as sample 1-1, the width of crystal grain boundary at the interface with the intermediate layer is half or less of the width of crystal grain boundary at the mid position of the magnetic recording layer. It is shown that the width of crystal grain boundary at the interface with the intermediate layer is narrower than the width of crystal grain boundary at the mid position of the magnetic recording layer.

On the other hand, in the sample 1-7 of the embodiment 1, the width of crystal grain boundary at the mid position of the magnetic recording layer is 1.1 nm and the width of crystal grain boundary at the interface of the magnetic recording layer with the intermediate layer is 0.9 nm. This means that the difference in the width of crystal grain boundary between the interface of the magnetic recording layer with the intermediate layer and the mid position of the magnetic recording layer is smaller, as compared with the samples 1-1 to 5. In the samples 1-6 to 12, the difference in the width of crystal grain boundary between the interface of the magnetic recording layer with the intermediate layer and the mid position of the magnetic recording layer was less than 20%. It is thought that an error of about 20% is included when the width of crystal grain boundary is around 1 nm because of accuracy in the measurement, so that it can be determined that the samples 1-6 to 12 have an almost constant width of crystal grain boundary in the magnetic recording layer, from the interface with the intermediate layer to the mid position of the magnetic recording layer.

Table 2 shows the media S/N values of these samples. The samples 1-6 to 12, in which the widths of the crystal grain boundaries of the magnetic recording layers were almost constant from the interface with the intermediate layer to the mid position of the recording layer, have higher media S/N values than the samples 1-1 to 15, in which the widths of crystal grain boundaries at the interface with the intermediate layer become narrower as compared with those at the mid position of the magnetic recording layer. That is, it is found that the width of crystal grain boundary of the magnetic recording layer should be constant from the interface with the intermediate layer to the mid position of the magnetic recording layer in order to obtain a higher media S/N value.

Figure 3:
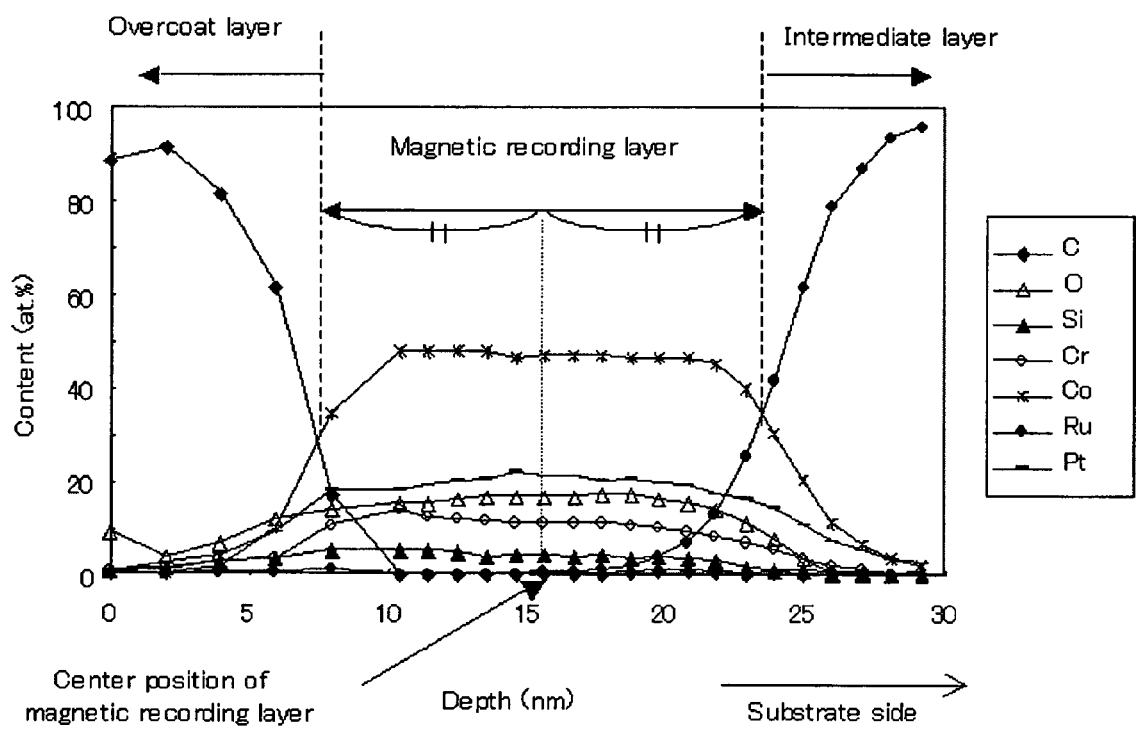
FIG. 3 shows a depth profile of the composition in a sample.

Next, the composition analyses of these samples along the depth direction were carried out by using X-ray photoelectron spectroscopy. As an example, the result of sample 1-1 is shown in FIG. 3. Herein, the points where the profile of the main element of the magnetic recording layer Co intersects respectively, the profile of the main element of the overcoat layer C and the profile of the main element of the intermediate layer Ru are obtained, and the mid position of these two points is assumed to be the mid position of the magnetic recording layer. Moreover, the average value of the contents of three or more points at positions within 3 nm on either side of the mid position of the magnetic recording layer is assumed to be the content at the mid position of the magnetic recording layer.

Figure 4:
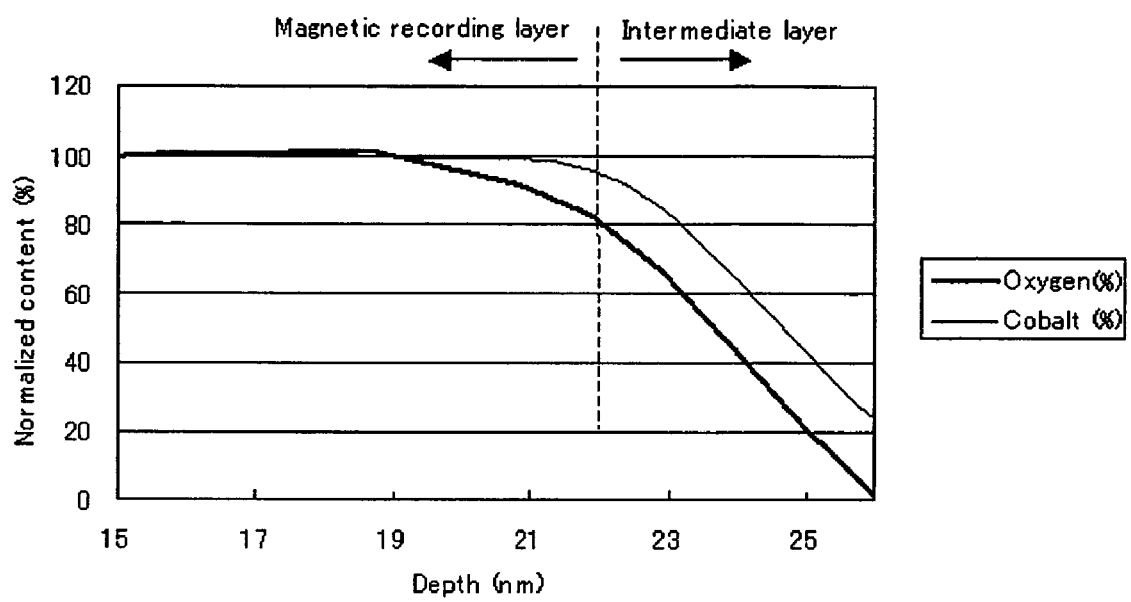
FIG. 4 shows the distributions of Co and O in a sample.
Figure 5:
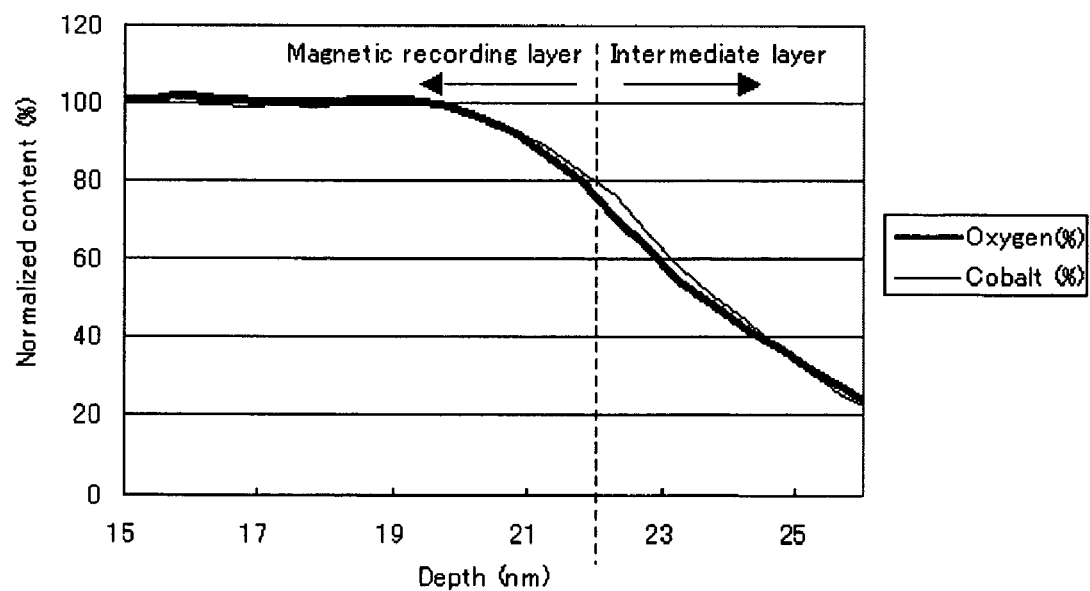
FIG. 5 shows the distributions of Co and O in a sample.

Next, FIGS. 4 and 5 show the obtained results of profiles normalized by the content at the mid position of each magnetic recording layer, paying attention to the main element of the magnetic recording layer Co and the main element of the grain boundaries O. FIG. 4 shows the result of sample 1-1 and FIG. 5 shows the result of sample 1-7. FIG. 4 shows that the normalized content of O starts decreasing at a depth position of approximately 19 nm. On the other hand, Co starts decreasing at a depth position of approximately 21 nm, that is, the content of O starts decreasing from a position about 2 nm shallower as compared with Co. This means that, in the sample 1-1 of the comparative example 1, there is a shortage of oxide, which should become the crystal grain boundaries around the interface of the magnetic recording layer with the intermediate layer. On the other hand, in FIG. 5, the normalized contents of Co and O start decreasing at almost the same depth position. It is found that, compared with the sample 1-1, the sample 1-7 has almost no layer in which there is a shortage of oxide around the interface of the magnetic recording layer with the intermediate layer.

In the above-mentioned composition analysis profiles of Co and O normalized by the contents at the mid position of magnetic recording layer, the layer thickness d, in which there is a shortage of oxide in the magnetic recording layer, is defined by the following expression; in which the positions where the normalized content of Co and O reach 95% on the intermediate layer side expressed respectively as $P\_{Co}$ and $P\_{O}$.

$$d = P\_{Co} - P\_{O}$$

Figure 6:
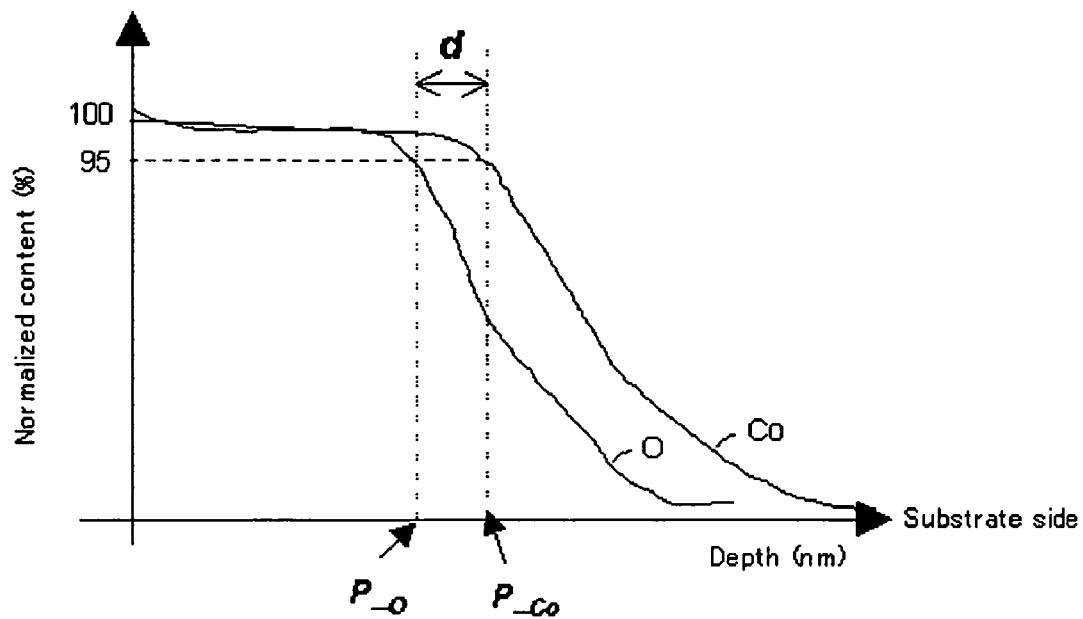
FIG. 6 shows the definitions of $P_{-Co}$, $P_{-O}$, and thickness d.

FIG. 6 shows the definition of $P\_{Co}$, $P\_{O}$, and thickness d. The larger the d value, the thicker is the layer deficient in oxide around the interface of the magnetic recording layer with the intermediate layer.

Figure 7:
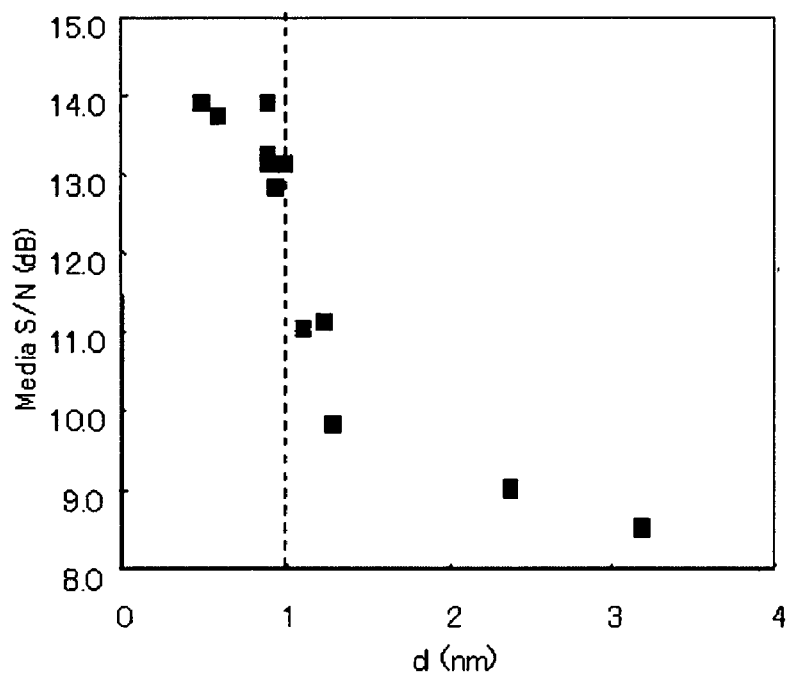
FIG. 7 shows the relationship between d and media S/N value.

FIG. 7 shows a relationship between the media S/N value and the d value obtained by the composition analyses of the comparative example 1 and the embodiment 1 using X-ray photoelectron spectroscopy. The smaller the d value, the higher is the media S/N value. Moreover, the media S/N value changes drastically at a d value of around 1 nm, so that it is understood that a high media S/N value can be obtained by making the thickness of the layer d in which there is a shortage of oxide to be 1 nm or less.

In the conventional manufacturing methods and layer structures it is impossible to avoid a shortage of oxide which will make crystal grain boundaries around the interface of the magnetic recording layer with the intermediate layer. This is caused by a low sputtering yield of oxide compared with Co-based alloy. Actually, when a medium having the same structure as that of the sample 1-1 was formed using a co-sputter method in which the discharge of the $SiO_2$ target was made faster than that of the CoCrPt target while depositing the magnetic recording layer, considering the difference in the sputter yield, the layer thickness d deficient in oxide can be made 1 nm or less and a 2.5 dB higher media S/N value could be obtained as compared with the sample 1-1. Moreover, as shown in the present invention, one can make up for a shortage of oxide around the interface of the magnetic layer with the intermediate layer caused by a difference in the sputtering yield by inventing a layer structure of the intermediate layer without changing the method for manufacturing the magnetic recording layer, resulting in a higher media S/N value being obtained.

Figure 8:
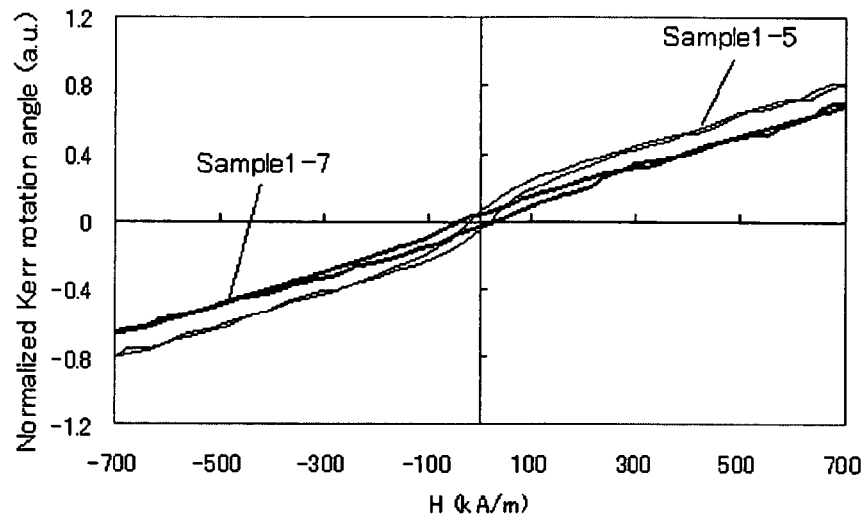
FIG. 8 shows Kerr loops measured by using a Kerr effect magnetometer applying a magnetic field H in the in-plane direction.
Figure 9:
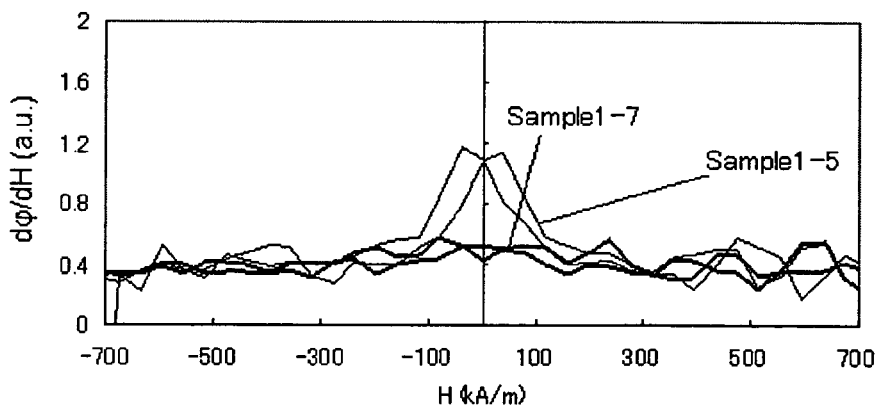
FIG. 9 shows $d\phi/dH$ of Kerr rotation angle $\phi$.

FIG. 8 shows Kerr loops of the sample 1-5 of the comparative example 1 and the sample 1-7 of the embodiment 1 measured by using a Kerr effect magnetometer. At this time, the magnetic field was applied in the in-plane direction. FIG. 9 shows the $d\phi/dH$ plots where the Kerr rotation angle $\phi$ is differentiated by the applied magnetic field H. The sample 1-5 of the comparative example 1 has a peak of $d\phi/dH$ in the vicinity of zero magnetic field. On the other hand, it almost cannot be observed in the sample 1-7 of the embodiment 1. It is thought that this peak of $d\phi/dH$ at around zero magnetic field reflects a large inter-granular exchange coupling existing around the interface of the magnetic recording layer with the intermediate layer.

In order to quantify the peak at around zero magnetic field, the average value b of $d\phi/dH$ is defined in the range of $-700$ kA/m $\leq H \leq -400$ kA/m and $400$ kA/m $\leq H \leq 700$ kA/m, and the average value a of $d\phi/dH$ is defined in the range of $-16$ kA/m $\leq H \leq 16$ kA/m. The intensity of the peak in $d\phi/dH$ in the vicinity of zero magnetic field becomes lower as the value of a/b approaches 1.

Figure 2:
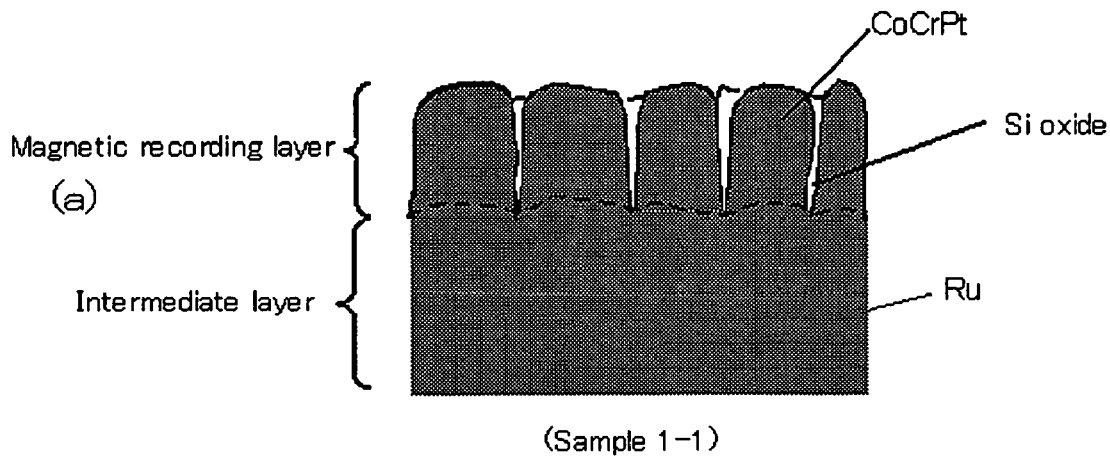
FIG. 2 illustrates TEM cross-sectional images.
Figure 2:
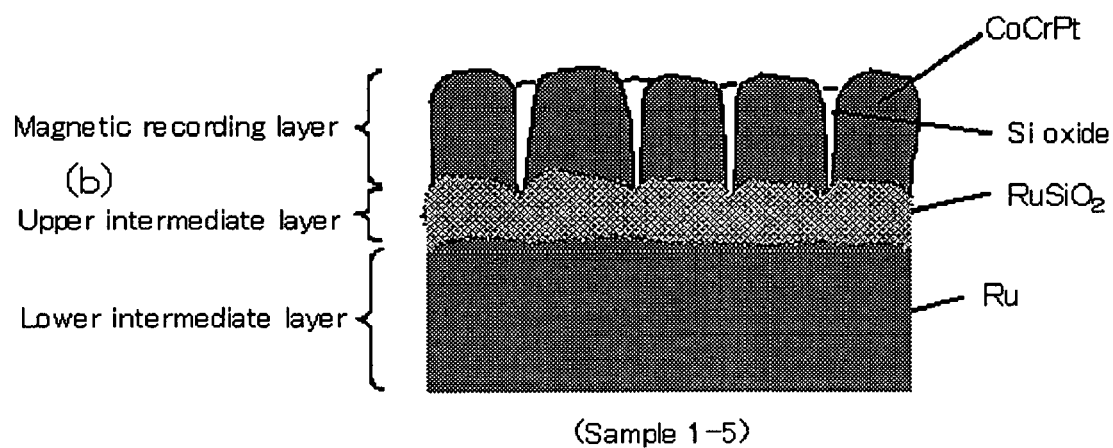
Figure 2:
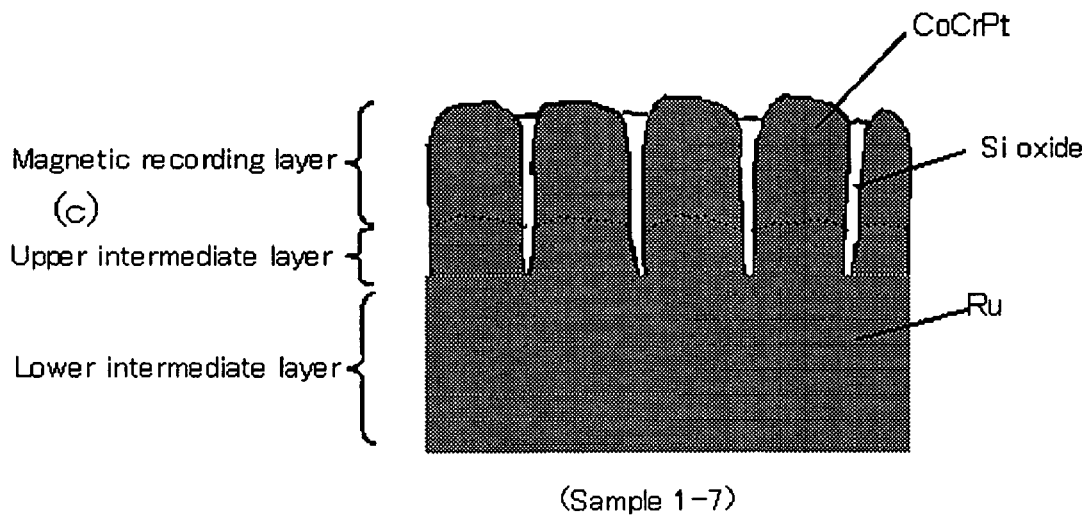
Figure 10:
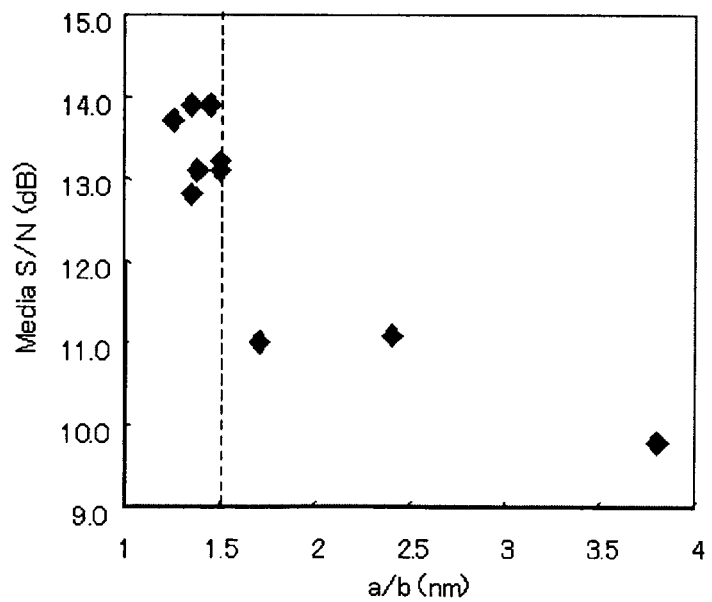
FIG. 10 shows the relationship between a/b and media S/N value.

FIG. 10 shows the relationship between a/b and media S/N value. The media S/N value changes drastically at an a/b value of 1.5, and a high media S/N value could be obtained in the case when the value of a/b is 1.5 or less. Even in a sample like the samples 1-1 and 1-7 which had almost no difference in the Kerr loops measured by applying a magnetic field in a perpendicular direction, if some difference was observed in the $d\phi/dH$ of the Kerr loop at around zero magnetic field measured by applying a magnetic field in the in-plane direction, the media S/N value changed drastically. This means that the inter-granular exchange coupling is changed by a slight difference in the width of crystal grain boundary around the interface of the magnetic recording layer with the intermediate layer as shown in FIG. 2, and it influences the recording/reproducing characteristics to a major degree.

Next, attention is paid to the relationship between the structure of the intermediate layer of the fabricated sample and the media S/N value. The samples 1-7 6 to 12 having high media S/N values are ones to which oxide is added in the upper intermediate layer. Moreover, as shown in FIG. 2(c), the crystal grain boundaries with bright contrast were observed continuously from the upper intermediate layer to the magnetic recording layer, whereby, it was understood that not only the magnetic recording layer but also the upper intermediate layer had a granular structure consisting of crystal grains mainly composed of Ru and oxide grain boundaries surrounding them. On the other hand, in the sample 1-3 to 5 which did not have a high media S/N although they used intermediate layers with added oxide, the same as the sample 1-7 to 12, a clear contrast could not be observed in the upper intermediate layers as shown in FIG. 2(b), and the upper intermediate layer did not have a granular structure. That is, it is understood that, in order to obtain a higher media S/N value, the upper intermediate layer needed to consist of a Ru-based alloy in which an oxide was added, and to have a granular structure consisting of crystal grains mainly composed of Ru and oxide grain boundaries surrounding them. In the case when RuCo and RuCoCr were used for the lower intermediate layer in lieu of Ru, a high media S/N value was obtained in the sample in which the upper intermediate layer had a granular structure. In the case when a material except for a metallic material such as Si oxide is added to the lower intermediate layer, a granular structured upper intermediate layer could not be observed. Therefore, the lower intermediate layer should be Ru or Ru-based alloy to which are added metallic elements.

Moreover, in order to make the upper intermediate layer a structure consisting of Ru crystal grains and oxide grain boundaries surrounding them, it is necessary to create roughness, which will be a trigger for grain boundary formation, in the lower intermediate layer placed underneath the upper intermediate layer. As a result of studying various deposition conditions, it was understood that it is necessary to deposit the second lower intermediate layer by sputtering under at least one condition selected from an Ar atmosphere of 2 Pa or more and 6 Pa or less and a deposition rate 1 nm per second or less, in order to create in the lower intermediate layer surface roughness which becomes a trigger for grain boundary formation, and to make the upper intermediate layer a structure consisting of Ru crystal grains and oxide grain boundaries surrounding them.

Although a magnetic recording layer in which 17.5 vol % of Si oxide was added into the Co-17 at % Cr-14 at % Pt alloy in the embodiment 1, the same tendency as the embodiment 1 could be obtained in the case when the addition of Si oxide is changed to be 15 vol % and 20 vol % and Co-15 at % Cr-14 at % Pt, Co-19 at % Cr-14 at % Pt, and Co-17 at % Cr-16 at % Pt having different CoCrPt alloy compositions were used. Moreover, as the results of studying various oxides which are added in the magnetic recording layer and the upper intermediate layer, the same tendency as the embodiment 1 could be observed when Al oxide, Ti oxide, Cr oxide, and Mo oxide are used in lieu of Si oxide.

The samples 1-6, 1-7 and samples 1-10 to 12 in the embodiment 1 are the ones which only have different oxides added to the upper intermediate layer. Comparing the media S/N value of these samples, the highest media S/N value was obtained in the sample 1-7 in which the same Si oxide as the magnetic recording layer is added to the upper intermediate layer. As a result of studying the combination of oxides added to the magnetic recording layer and the upper intermediate layer for the samples of a magnetic recording layer to which is added oxide in lieu of Si oxide, it was understood that a higher media S/N value could be obtained in a medium in which the main element, except for oxygen, consisting of the grain boundaries of the upper intermediate layer was identical with the main element, except for oxygen, consisting of the grain boundaries of the magnetic recording layer.

Embodiment 2

The perpendicular magnetic recording media of the embodiment 2 and the comparative example 2 were fabricated using the same layer structure and deposition conditions as those of the sample 1-7 of the embodiment 1 except for the deposition condition and thickness of the first lower intermediate layer 20 and the second lower intermediate layer 21. Table 3 shows the deposition conditions and thicknesses of the first lower intermediate layer and the second lower intermediate layer of the embodiment 2 and the comparative example 2. The values of full width at half-maximum $\Delta\theta_{50}$ of the Rocking curves of the Ru (0002) diffraction peak measured by using X-ray diffraction are listed in Table 3.

A higher crystal grain alignment with the $\Delta\theta_{50}$ value of 5 or less was obtained in a sample, in which the first lower intermediate layer was fabricated by sputtering under at least one condition selected from an Ar gas atmosphere of 0.5 Pa or more and 1 Pa or less and a deposition rate of 2 nm per second or less.

Figure 11:
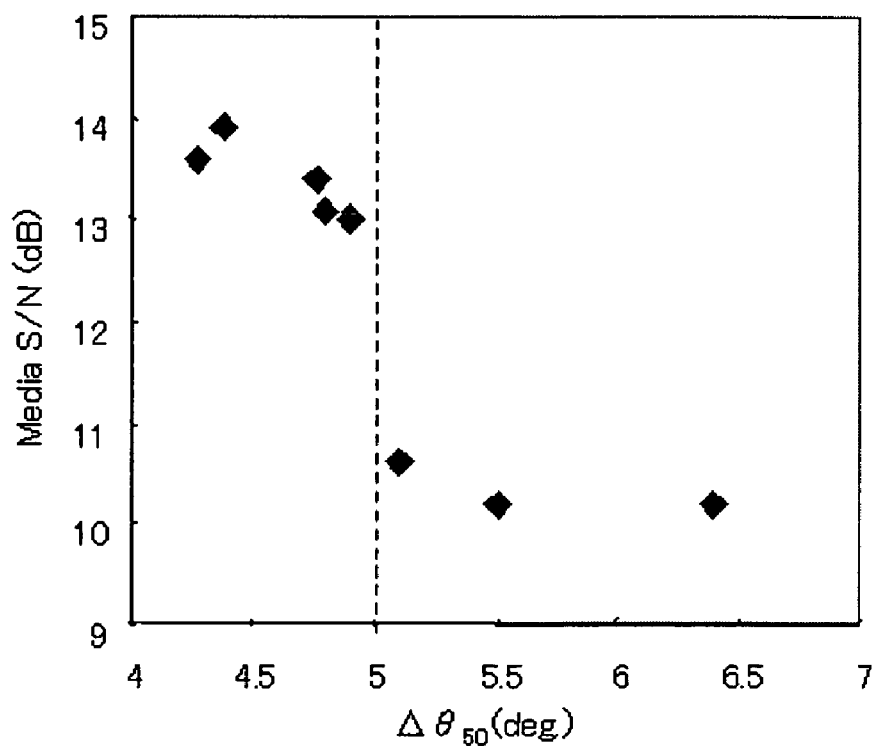
FIG. 11 shows the relationship between the value of full width at half-maximum $\Delta\theta_{50}$ of the Rocking curves of the Ru (0002) diffraction peak and media S/N value.
Figure 12:
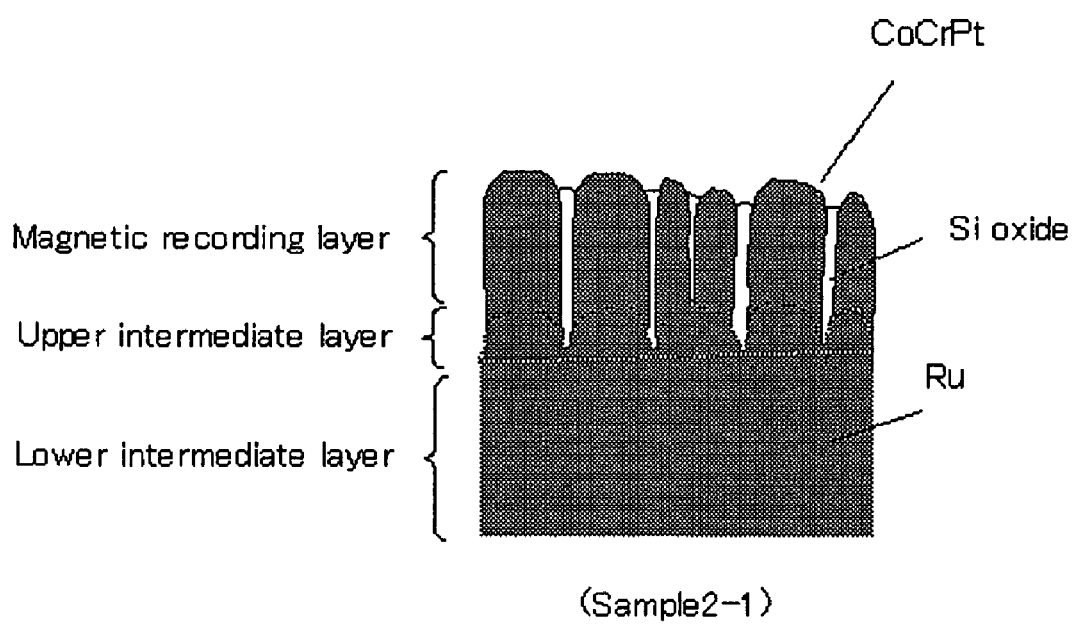
FIG. 12 is a drawing of a TEM cross-sectional image shown in the comparable example 2.

FIG. 11 shows the relationship between the media S/N value and the value of full width at half-maximum $\Delta\theta_{50}$ of the Rocking curves of the Ru (0002) diffraction peak measured by using X-ray diffraction. The media S/N value changed at around $\Delta\theta_{50}$ of 5° and a higher media S/N value could be obtained in the sample which had high crystal grain alignment with the $\Delta\theta_{50}$ of 5° or less. The cross-sections of these samples were observed by using a Transmission Electron Microscope (TEM), and it was found that each upper intermediate layer had a granular structure separating the Ru and Si oxides. However, as shown in FIG. 12, it was found that crystal grains which did not correspond 1-to-1 to the crystal grains of the upper intermediate layer were observed in the magnetic recording layer in the samples 2-1 to 3 having a $\Delta\theta_{50}$ value greater than 5°, and it was easy for the dispersion of the crystal grain size to become larger. That is, in order to obtain a higher media S/N value it is necessary to make the full width at half-maximum $\Delta\theta_{50}$ of the Rocking curves of the Ru (0002) diffraction peak measured by using X-ray diffraction 5° or less.

Embodiment 3

The perpendicular magnetic recording medium of the embodiment 3 was fabricated using the same layer structure and deposition conditions as those of the sample 1-7 of the embodiment 1 except for the upper intermediate layer 19. Addition of Si oxide to the upper intermediate layer was changed in the embodiment 3. A perpendicular magnetic recording medium was prepared as a comparative sample by the same layer structure and the same process conditions as the embodiment 3 except for not adding Si oxide to the upper intermediate layer, and this was used for the comparative sample 3.

Figure 13:
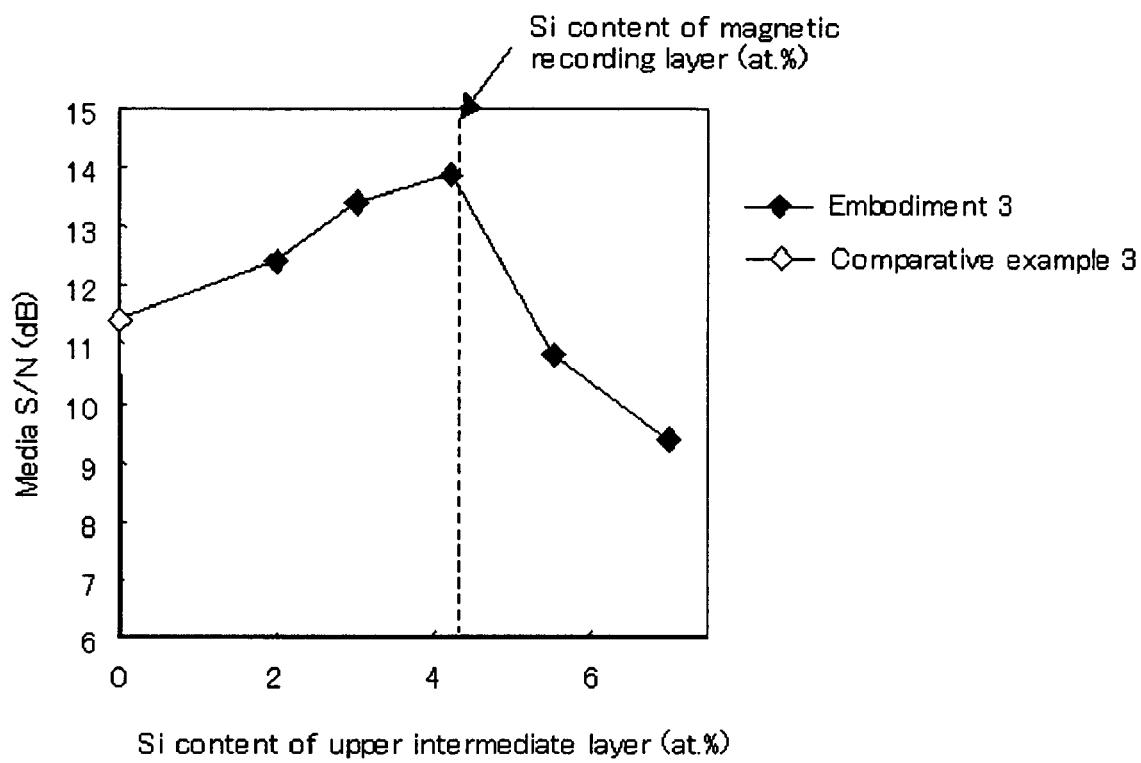
FIG. 13 shows the relationship between Si content of the upper intermediate layer and media S/N value.

The Si content being the main element, except for O, of the oxide added into the upper intermediate layer was measured by using X-ray photoelectron spectroscopy (XPS), and the relationship between the Si content of the upper intermediate layer and the media S/N value is shown in FIG. 13. The Si ratio of the magnetic recording layer is also shown in FIG. 13. In the case when the Si content of the upper intermediate layer is the same or less than the Si content of the magnetic recording layer, a higher media S/N value was obtained compared to the comparative example 3. However, in the case when a greater amount of Si was added in the upper intermediate layer than the Si content of the magnetic recording layer, the media S/N value was reduced drastically.

It is thought that the crystal grain alignment of the magnetic recording layer deteriorates because the matching between the crystal grain size and the width of grain boundary of the upper intermediate layer and the magnetic recording layer becomes worse when a greater amount of Si oxide is added into the upper intermediate layer than the Si oxide added into the magnetic recording layer. That is, it is understood that the content of the main element, except for oxygen, constituting the grain boundaries of the upper intermediate layer obtained according to composition analysis by X-ray photoelectron spectroscopy must be the same or less than the content of the main element except for oxygen constituting the grain boundaries of the magnetic recording layer in order to promote formation of oxide grain boundaries around the interface of the magnetic recording layer with the intermediate layer while maintaining the high crystal grain alignment in the magnetic recording layer. The same results could be obtained when Al oxide, Ti oxide, Cr oxide, and Mg oxide were added in the upper intermediate layer in lieu of Si oxide.

Embodiment 4

The perpendicular magnetic recording medium of the embodiment 4 was fabricated using the same layer structure and deposition conditions as those of the sample 1-7 of the embodiment 1 except for the thickness of the upper intermediate layer 19. The thickness of the upper intermediate layer was changed in the embodiment 4.

Figure 14:
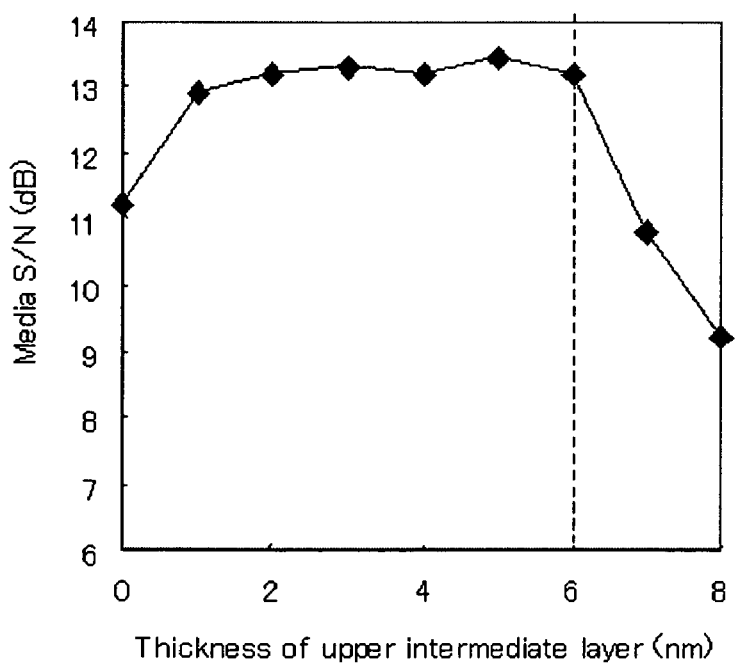
FIG. 14 shows the relationship between thickness of the upper intermediate layer and media S/N value.

FIG. 14 shows the relationship between the thickness of the upper intermediate layer and the media S/N value. As shown in FIG. 14, a higher media S/N value is obtained when the thickness of the upper intermediate layer is 1 nm or more and 6 nm or less. It is thought that a homogeneous granular structure is hard to create in the upper intermediate layer along the vertical direction in the case when the upper intermediate layer is too thick and the crystal grain alignment of the recording layer is deteriorated. That is, it is necessary for the thickness of the upper intermediate layer to be 1 nm or more and 6 nm or less in order to promote formation of oxide grain boundaries around the interface of the magnetic recording layer with the intermediate layer while maintaining the high crystal grain alignment in the magnetic recording layer.

The same results could be obtained when Al oxide, Ti oxide, Cr oxide, and Mg oxide are added in the upper intermediate layer in lieu of Si oxide.

Embodiment 5

The perpendicular magnetic recording media shown in the samples 5-1 to 9 were fabricated using the same layer structure and deposition conditions as those of the sample 1-7 of the embodiment 1 except for the deposition conditions of the first lower intermediate layer 20 and the second lower intermediate layer 21. Table 4 shows the deposition conditions of the first intermediate layer and the second lower intermediate layer of each sample.

The surface roughness and crystal grain alignment of the layers can be changed by changing the deposition rate and gas pressure. When a film is deposited under a high gas pressure and a low deposition rate, there is a tendency that the surface roughness becomes greater and the crystal grain alignment becomes worse. On the other hand, when a film is deposited under a low gas pressure and a high deposition rate, there is a tendency that the surface roughness becomes smaller and the crystal grain alignment becomes better. As shown in Table 4, a higher media S/N value could be obtained in the case when the second lower intermediate layer was deposited under a higher gas pressure than the first lower intermediate layer, when the second lower intermediate layer was deposited at a lower deposition rate than the first lower intermediate layer, and when the second lower intermediate layer is deposited under a higher gas pressure and at a lower deposition rate than the first lower intermediate layer. That is, it is understood that a high media S/N value can be obtained in the case when a film with excellent crystal grain alignment is deposited as the first intermediate layer and a film having large surface roughness is deposited as the second intermediate layer.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

TABLE 1

|  | Sample | Materials of seed layer (thickness of seed layer) | Materials of intermediate layer (Ar gas pressure, deposition rate, thickness of intermediate layer) | | |
| --- | --- | --- | --- | --- | --- |
| Comparative example 1 | 1-1 | Ta (1 nm) | Ru (2.2 Pa, 0.2 nm/s, 20 nm) | | |
|  | 1-2 | Ta (1 nm) | Ru (1 Pa, 6.5 nm/s, 20 nm) | | |
|  | 1-3 | Ta (1 nm) | RuSiO2 (2.2 Pa, 0.5 nm/s, 4 nm) | | |
|  | 1-4 | N-11 at % Fe-44 at% Cr (5 nm) | RuSiO2 (2.2 Pa, 0.5 nm/s, 4 nm) | | |
|  |  | Materials of seed layer (thickness of seed layer) | Materials of lower intermediate layer (Ar gas pressure, deposition rate) | Materials of upper intermediate layer (Ar gas pressure, deposition rate) | |
|  | 1-5 | Ta (1 nm) | Ru (0.8 Pa, 65 nm/s) | RuSiO2 (2.2 Pa, 0.5 nm/s) | |
|  | Sample | Materials of seed layer (thickness of seed layer) | Materials of 1st lower intermediate layer (Ar gas pressure, deposition rate) | Materials of 2nd lower intermediate layer (Ar gas pressure, deposition rate) | Materials of upper intermediate layer (Ar gas pressure, deposition rate) |
| Embodiment 1 | 1-6 | Ta (1 nm) | Ru (1 Pa, 6.5 nm/s) | Ru (2.2 Pa, 0.2 nm/s) | RuAl2O3 (2.2 Pa, 0.5 nm/s) |
|  | 1-7 | Ta (1 nm) | Ru (1 Pa, 6.5 nm/s) | Ru (2.2 Pa, 0.2 nm/s) | RuSiO2 (2.2 Pa, 0.5 nm/s) |
|  | 1-8 | Ta (1 nm) | Ru (0.5 Pa, 1 nm/s) | Ru (4 Pa, 0.9 nm/s) | RuSiO2 (2.2 Pa, 0.5 nm/s) |
|  | 1-9 | N-11 at % Fe-44 at % Cr (5 nm) | Ru (1 Pa, 6.5 nm/s) | Ru (2.2 Pa, 0.2 nm/s) | RuSiO2 (2.2 Pa, 0.5 nm/s) |
|  | 1-10 | Ta (1 nm) | Ru (1 Pa, 6.5 nm/s) | Ru (2.2 Pa, 0.2 nm/s) | RuTiO2 (2.2 Pa, 0.5 nm/s) |
|  | 1-11 | Ta (1 nm) | Ru (1 Pa, 6.5 nm/s) | Ru (2.2 Pa, 0.2 nm/s) | RuCr2O3 (2.2 Pa, 0.5 nm/s) |
|  | 1-12 | Ta (1 nm) | Ru (1 Pa, 6.5 nm/s) | Ru (2.2 Pa, 0.2 nm/s) | RuMgO (2.2 Pa, 0.5 nm/s) |

TABLE 2

|  | Sample | Media S/N (dB) |
| --- | --- | --- |
| Comparative example 1 | 1-1 | 11.0 |
|  | 1-2 | 9.8 |
|  | 1-3 | 8.5 |
|  | 1-4 | 9.0 |
|  | 1-5 | 11.1 |
| Embodiment 1 | 1-6 | 13.1 |
|  | 1-7 | 13.9 |
|  | 1-8 | 13.9 |
|  | 1-9 | 13.7 |

TABLE 2-continued

| Sample | Media S/N (dB) |
|---|---|
| 1-10 | 13.2 |
| 1-11 | 12.5 |
| 1-12 | 12.8 |

TABLE 3

| | Sample | Materials of 1st lower intermediate layer (Ar gas pressure, deposition rate) | Materials of 2nd lower intermediate layer (Ar gas pressure, deposition rate) | Δθ₅₀ (deg) |
|---|---|---|---|---|
| Comparative example 2 | 2-1 | Ru (2.2 Pa, 0.2 nm/s, 8 nm) | Ru (2.2 Pa, 0.2 nm/s, 8 nm) | 5.1 |
| | 2-2 | Ru (4 Pa, 0.2 nm/s, 8 nm) | Ru (4 Pa, 0.2 nm/s, 8 nm) | 5.5 |
| | 2-3 | Ru (6 Pa, 0.2 nm/s, 8 nm) | Ru (6 Pa, 0.2 nm/s, 8 nm) | 6.4 |
| Embodiment 2 | 2-4 | Ru (1 Pa, 6.5 nm/s, 12 nm) | Ru (2.2 Pa, 0.2 nm/s, 4 nm) | 4.3 |
| | 2-5 | Ru (1 Pa, 6.5 nm/s, 8 nm) | Ru (2.2 Pa, 0.2 nm/s, 8 nm) | 4.4 |
| | 2-6 | Ru (1 Pa, 6.5 nm/s, 4 nm) | Ru (2.2 Pa, 0.2 nm/s, 12 nm) | 4.8 |
| | 2-7 | Ru (0.5 Pa, 1.2 nm/s, 12 nm) | Ru (4 Pa, 0.5 nm/s, 4 nm) | 4.8 |
| | 2-8 | Ru (1 Pa, 1.2 nm/s, 8 nm) | Ru (2.2 Pa, 0.5 nm/s, 8 nm) | 4.9 |

TABLE 4

| Sample | 1st lower intermediate layer | | 2nd lower intermediate layer | | Media S/N (dB) |
|---|---|---|---|---|---|
| | deposition rate (nm/s) | Ar gas pressure (Pa) | deposition rate (nm/s) | Ar gas pressure (Pa) | |
| 5-1 | 2.5 | 0.7 | 0.5 | 2.5 | 13.5 |
| 5-2 | 0.5 | 0.7 | 0.5 | 2.5 | 13.1 |
| 5-3 | 0.3 | 0.7 | 0.5 | 2.5 | 12.4 |
| 5-4 | 2.5 | 3.1 | 0.5 | 3.1 | 12.9 |
| 5-5 | 0.5 | 3.1 | 0.5 | 3.1 | 10.8 |
| 5-6 | 0.3 | 3.1 | 0.5 | 3.1 | 9.5 |
| 5-7 | 2.5 | 5.2 | 0.5 | 2.5 | 12.5 |
| 5-8 | 0.5 | 5.2 | 0.5 | 2.5 | 9.3 |
| 5-9 | 0.3 | 5.2 | 0.5 | 2.5 | 8.7 |

What is claimed is:

1. A perpendicular magnetic recording medium, comprising:
a substrate;
a soft-magnetic underlayer deposited on said substrate;
a lower intermediate layer containing Ru deposited on said soft-magnetic underlayer;
an upper intermediate layer deposited on said lower intermediate layer and having Ru crystal grains and oxide crystal grain boundaries;
a magnetic recording layer deposited on said upper intermediate layer and having crystal grains and oxide crystal grain boundaries,
wherein the crystal grains of said magnetic recording layer grow epitaxially on the Ru crystal grains of said upper intermediate layer, and the crystal grain boundaries of said magnetic recording layer grow on the crystal grain boundaries of said upper intermediate layer,
wherein said magnetic recording layer consists of a CoCrPt-based alloy to which is added at least one selected from the group consisting of Si oxide, Al oxide, Ti oxide, Cr oxide and Mg oxide, and
wherein a difference in position in the depth direction, at which the contents of oxygen and Co maintain 95% of the value of respective contents thereof at the mid position in the depth direction of said magnetic recording layer, is 1 nm or less in a depth profile of the element content around the interface of said magnetic recording layer with said upper intermediate layer obtained by making discharge of an oxide target faster than that of a magnetic target during formation of said magnetic layer.

2. A perpendicular magnetic recording medium according to 1, wherein said lower intermediate layer includes Ru or a Ru-based alloy.

3. A perpendicular magnetic recording medium according to 1, wherein the crystal grain boundaries of said upper intermediate layer comprise at least one material selected from the group consisting of Si oxide, Al oxide, Ti oxide, Cr oxide, and Mg oxide.

4. A perpendicular magnetic recording medium according to 1, wherein the content of the main element, except for oxygen, constituting the grain boundaries of said upper intermediate layer obtained by a composition analysis using X-ray photoelectron spectroscopy (XPS) is the same as or less than the content of the main element, except for oxygen, constituting the grain boundaries of said magnetic recording layer.

5. A perpendicular magnetic recording medium according to 1, wherein the thickness of said upper intermediate layer is 1 nm or more and 6 nm or less.

6. A perpendicular magnetic recording medium according to 1, wherein the main element, except for oxygen, constituting the grain boundaries of said upper intermediate layer is identical to the main element, except for oxygen, constituting the grain boundaries of said magnetic recording layer.

* * * * *